United States Patent [19]

Koike et al.

[11] Patent Number: 4,586,097
[45] Date of Patent: Apr. 29, 1986

[54] DISKETTE EJECTING MECHANISM FOR MAGNETIC DISK UNIT

[75] Inventors: Kazuo Koike; Junji Kawada, both of Kanagawa, Japan

[73] Assignee: Mitsubishi Denki Kabushiki Kaisha, Tokyo, Japan

[21] Appl. No.: 476,266

[22] Filed: Mar. 17, 1983

[30] Foreign Application Priority Data

Apr. 15, 1982 [JP] Japan .............................. 57-54593[U]

[51] Int. Cl.$^4$ ...................... G11B 5/016; G11B 5/012; G11B 5/008; G11B 17/00
[52] U.S. Cl. ........................................ 360/99; 360/97; 360/96.5
[58] Field of Search ................... 360/97, 99, 96.5, 133, 360/137, 93; 242/198

[56] References Cited

U.S. PATENT DOCUMENTS

| 3,890,643 | 6/1975 | Dalziel ................................. 360/99 |
| 4,380,782 | 4/1983 | Hirose et al. ......................... 360/99 |
| 4,405,957 | 9/1983 | Vorbach et al. ....................... 360/99 |
| 4,415,940 | 11/1983 | Becker ................................ 360/99 |
| 4,485,464 | 11/1984 | Shimaoka ............................. 360/97 |

FOREIGN PATENT DOCUMENTS 45-13744  5/1970  Japan .................................. 242/198

*Primary Examiner*—John H. Wolff
*Assistant Examiner*—Alfonso Garcia
*Attorney, Agent, or Firm*—Bernard, Rothwell & Brown

[57] ABSTRACT

In a diskette ejecting mechanism for magnetic disk unit being provided with a guide secured to a frame of the disk unit, an ejecting bedplate abutting against an end portion of a diskette and being mounted on the guide so as to be transferable in inserting and ejecting directions of the diskette, and a coiled spring energizing the ejection bedplate along the ejecting direction of the diskette. The mechanism does not require parts of suppressing the ejection bedplate such as conventional counter springs and the like because of utilization of torsional force of the coiled spring for ejecting the diskette as hooking force for the ejection bedplate.

6 Claims, 8 Drawing Figures

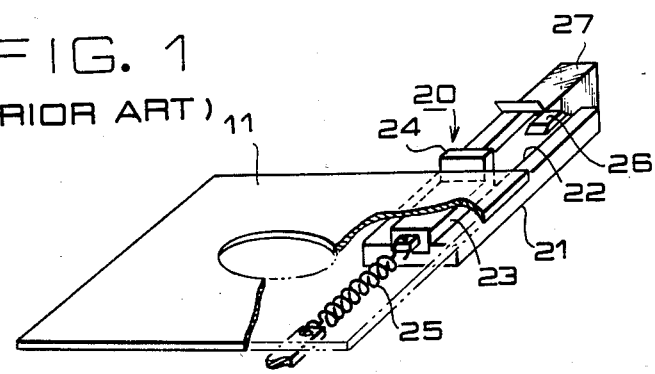
FIG. 1 (PRIOR ART)
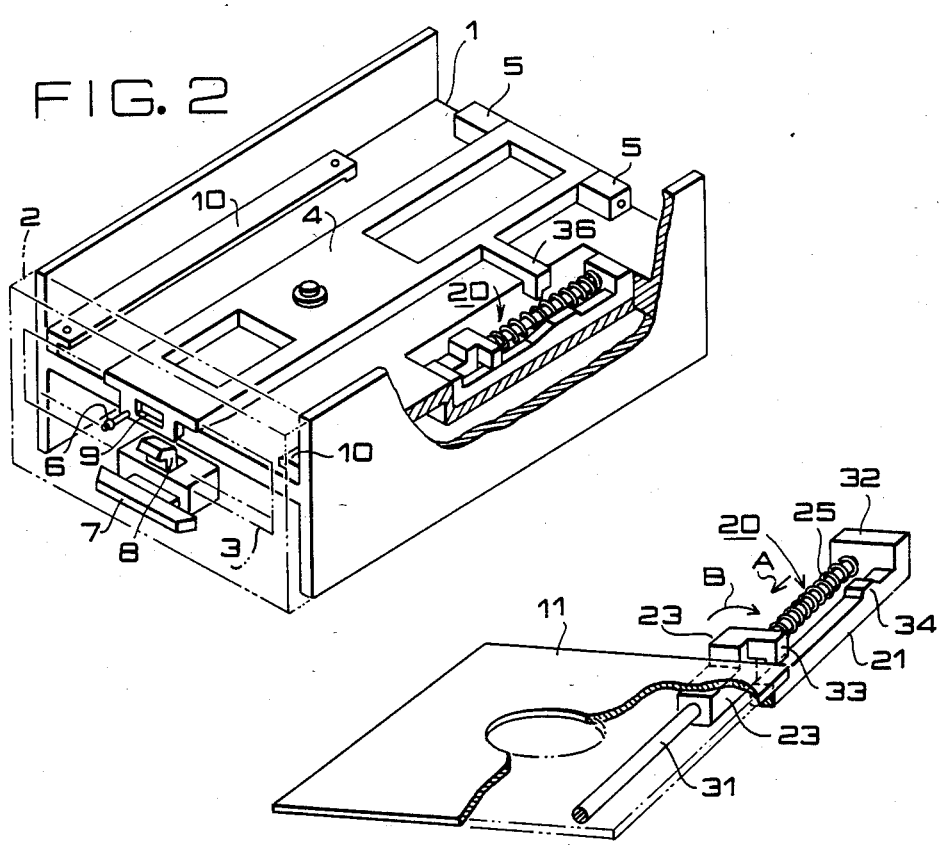
FIG. 2
FIG. 3

DISKETTE EJECTING MECHANISM FOR MAGNETIC DISK UNIT

BACKGROUND OF THE INVENTION

1. Field of the Invention

The present invention relates to a diskette (flexible disk cartridge) ejecting mechanism for a flexible magnetic disk memory unit.

2. Description of the Prior Art

An outline of such type of a conventional mechanism will be shown in FIG. 1 wherein reference character 11 designates a diskette, 21 a guide secured to a frame (not shown), 22 a slide groove defined on the guide 21, 23 an ejection bedplate sliding along the slide groove 22 and possessing a stepped portion 24 abutting against an end portion of the diskette 11, and 25 a spring for ejecting a cartridge. A going in and out claw 26 is provided on the rear end of the aforesaid slide groove 22 to hook the ejection bedplate 23, and reference character 27 designates a counter spring for suppressing the ejection bedplate 23.

Next, operations of the aforesaid mechanism will be described hereinbelow.

When the diskette 11 is inserted to the mechanism, the ejection bedplate 23 is slid in the slide groove 22 while extending the spring 25 for ejecting cartridge to be hooked by means of the claw 26 on the rear end of the groove 22. The counter spring 27 is one for suppressing the ejection bedplate 23 so as not to be slipped out from the mechanism. In case of ejecting the diskette, when the claw 26 is retracted, the ejection bedplate 23 is transferred by means of restoring force of the coiled spring 25.

In conventional ejecting mechanisms, whose ejection bedplate is transferred in accordance with only parallel transference so that parts for suppressing a slider such as a counter spring and the like are always required.

SUMMARY OF THE INVENTION

It is an object of the present invention to provide a diskette ejecting mechanism which does not require parts for suppressing an ejection bedplate such as conventional counter springs and the like, and the mechanism which is inexpensive and is easy in assembling the parts thereof and in adjustment therefor by utilizing torsional force of a coiled spring for ejecting a cartridge as hooking force for the ejection bedplate.

Another object of the present invention is to provide a diskette ejecting mechanism for magnetic disk unit being provided with a guide secured to a frame of the disk unit, an ejection bedplate abutting against an end portion of a diskette and being mounted on the guide so as to be transferable in inserting and ejecting directions of the diskette, and a coiled spring energizing the aforesaid ejection bedplate along the ejecting direction of the diskette, characterized in that the aforesaid ejection bedplate is rotatably mounted on the aforesaid guide around the transferring direction of the ejection bedplate as its axis; a slidable engaging piece sliding while contacting with the aforesaid guide at the time of transference of the ejection bedplate is mounted thereon; at the same time, an engaging stepped portion is defined on the aforesaid guide, the aforesaid engaging stepped portion engaging with the slidable engaging piece under such a condition that the diskette is forcibly inserted to a prescribed position to set the same to prevent the transference of the aforesaid ejection bedplate along the ejecting direction of the diskette by means of the aforesaid coiled spring; and torsional force of the coiled spring is applied to the aforesaid ejection bedplate as turning force towards the direction in which the slidable engaging piece contacts with the aforesaid guide.

BRIEF DESCRIPTION OF THE DRAWINGS

FIG. 1 is a perspective view showing a conventional diskette ejecting mechanism;

FIG. 2 is a perspective view showing an outline of an embodiment of the disk unit according to the present invention;

FIG. 3 is a perspective view showing a diskette ejecting mechanism for the disk of FIG. 2;

DETAILED DESCRIPTION OF THE PREFERRED EMBODIMENTS

Figure 4:
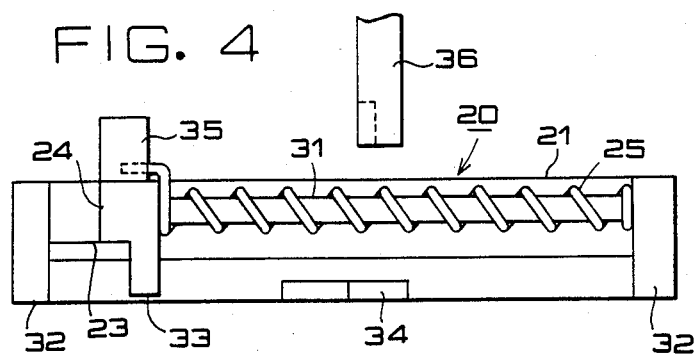
FIG. 4 is a planar view showing the diskette ejecting mechanism of FIG. 3.

An embodiment of the present invention will be described hereinbelow by referring to the accompanying drawings wherein like parts in FIGS. 2-6 corresponding to the respective parts of FIG. 1 are shown by the same reference characters. FIG. 2 shows a schematic construction of a flexible magnetic disk unit in which reference character 1 designates a frame for the disk unit, and 2 a designed panel which is attached to the frame 1 by means of screws or the like (not shown), but it is illustrated by chain line in the drawing for the sake of indicating each relationship between the respective parts. Reference character 3 designates a diskette insertion port defined on the designed panel, 4 a bridge for supporting a door (not shown) closing the diskette insertion port 3 and further supporting a means (not shown) for pushing the central portion of the diskette being forcibly inserted from the insertion port 3 to a prescribed position on rotatively driving means, 5 hinged supports for the aforesaid bridge 4 and each provided on the aforesaid frame 1 and upward turning force being given to the aforesaid bridge 4 in the drawing by utilizing each hinged support as its center, 6 an operating handle attached to an end of the bridge 4, 7 a door opening operation button, 8 a latch which engages with a hole 9 defined on an end of the aforesaid bridge 4 to keep the door mounted on the bridge 4 in its closed state, 10 guide means for inserting diskette disposed on opposite ends of the aforesaid frame 1, and 20 a diskette ejecting mechanism being the object of the present invention and which is attached to the frame 1.

The details of the diskette ejecting mechanism 20 will be described hereinbelow by referring to FIGS. 3 to 6 wherein reference character 21 designates a guide secured to the frame 1, 31 a guide rod placed between opposed end walls 32 and 32 of the guide 21, 23 an ejection bedplate which is supported by the guide rod 31 and which is mounted on the guide 21 in such a manner that it is transferrable in inserting and ejecting directions of the diskette 11 along the guide rod and rotatable around the guide rod 31 as its axis, 25 a coiled spring winding around the guide rod 31 extending between the ejection bedplate 23 and the end wall 32 of the guide, and one end of the coiled spring being fixed to the guide 21 or the guide rod 31, whilst the other end of the spring is hooked to a part of the ejection bedplate 23 with the application of a prescribed torsional force, whereby force transferring to the direction indicated by arrow A as well as turning force indicated by arrow B in FIG. 3 are given to the ejection bedplate 23.

Figure 5:
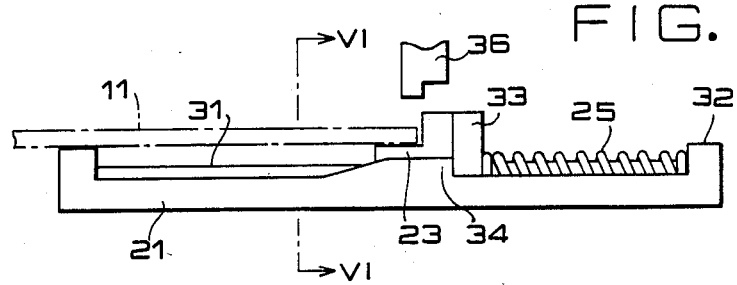
FIG. 5 is a front view showing the diskette ejecting mechanism of FIG. 3 which is in such a state that the diskette is forcibly inserted up to a prescribed position.

Reference character 33 designates a slidable engaging piece projected from a part of the aforesaid ejection bedplate 23 and which is slid together with the ejection bedplate 23 while contacting with the guide 21 by means of torsional force of the aforesaid coiled spring 25 at the time when the aforesaid ejection bedplate 23 is transferred. Reference character 34 designates an engaging stepped portion formed at a prescribed position of the rear side of the guide 21, i.e., a position where it is engaged with the aforesaid slidable engaging piece 33 in such a situation that the diskette 11 is forcibly inserted up to a prescribed utilizable position as shown in FIG. 5. The diskette ejecting mechanism is constructed in such a manner that the aforesaid slidable engaging piece 33 engages with the engaging stepped portion 34 to prevent transference towards the ejecting direction of the ejection bedplate 23.

Reference character 35 designates a projection for releasing engagement protrusively formed on the ejection bedplate 23 in the direction opposite to the aforesaid slidable engaging piece 33; 36 is an arm for releasing engagement mounted protrusively on the aforesaid bridge 4 (see FIG. 2). The arm for releasing engagement is positioned over the aforesaid projection 35 and is constructed in such a manner that the arm 36 abuts upon the projection 35 by means of downward turning force of the bridge 4 so that the ejection bedplate 23 is reversely turned until the engagement of the slidable engaging piece 33 with the engaging stepped portion 34 is disengaged against torsional force of the coiled spring 25.

Next, operations of the aforesaid embodiment will be described hereinbelow.

In the embodiment of the present invention, turning force arises always in the ejection bedplate 23 by applying previously torsional pilot pressure to the coiled spring 25 for ejection, and when the diskette 11 is inserted into the ejecting mechanism, the ejection bedplate 23 slides along the guide rod 31, whereby the slidable engaging piece 33 is hooked to the engaging stepped portion 34 of the rear side of the guide 21 by means of turning force of the ejection bedplate 23 itself. As a result, the diskette is maintained in a prescribed forcibly inserted situation.

In case of ejecting the diskette 11, it is sufficient for releasing the ejection bedplate 23 from the engaging stepped portion 34 of the guide 21 in accordance with any suitable manner.

Figures 6, 7:
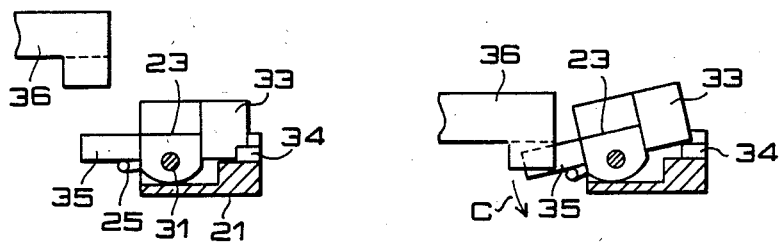
FIG. 6 is a sectional view taken along line VI—VI of FIG. 5.
FIG. 7 is a sectional view similar to that of FIG. 6 for explaining operations for releasing a state of engagement of the guide with the ejection bedplate.

In the above embodiment, such a manner in which vertical motion of the bridge is utilized for disengaging the slidable engaging piece 33 from engaging the stepped portion 34. Namely, when the bridge 4 is downwardly turned by means of the operating handle 6 (FIG. 2), the engagement releasing arm 36 abuts upon the engagement releasing projection 35 of the ejection bedplate 23 so that the ejection bedplate 23 is turned in the direction indicated by arrow C as shown in FIG. 7, whereby the engagement of the engaging stepped portion 34 of the guide 21 with the slidable engaging piece 33 is released. In this embodiment, however, even if the engagement of the aforesaid engaging piece 33 with the stepped portion 34 is released in such a situation where the bridge 4 is lowered, the transference of the ejection bedplate 23 towards the ejecting direction is prevented until the bridge 4 rises to a prescribed position (a position at which forcible insertion of the diskette by means of the bridge 4 upon the rotatively driving means is released).

And when the bridge 4 returns to the upper portion thereof, the engagement of the arm 36 with the projection 35 disappears so that the ejection bedplate 23 transfers to the ejecting direction by means of the coiled spring 25, and as a consequence, the diskette springs out at the insertion port 3.

Figure 8:
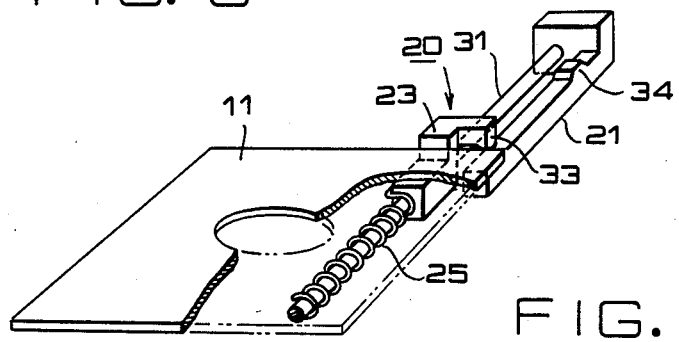
FIG. 8 is a perspective view showing another embodiment of the diskette ejecting mechanism according to the present invention.

Although the compression coiled spring 25 is employed in the above embodiment, a tension coiled spring 25 may be used as shown in FIG. 8.

Furthermore, although the engagement of the engaging piece of the ejection bedplate with the stepped portion of the guide is released by vertical motion of the bridge in the above embodiment, it may also be constructed in such a manner that, for example, either the diskette ejecting mechanism is interlocked with an operating button for door opening, or an exclusive releasing means for the engagement is provided, and after opening the insertion port of a diskette, the aforesaid means is operated.

As described above, according to the present invention, such advantages that the ejection bedplate is maintained in an engaged state by utilizing torsional force of the coiled spring which transfers the ejection bedplate so that parts such as counter spring and the like become unnecessary, and as the result, an inexpensive ejecting mechanism can be constructed are obtained.

What is claimed is:

1. A diskette ejecting mechanism for magnetic disk unit being provided with a guide (21) secured to a frame of said disk unit, an ejection bedplate (23) abutting against an end portion of a diskette and being mounted on said guide so as to be transferable in inserting and ejecting directions of said diskette, and a coiled spring (25) energizing said ejection bedplate along the ejecting direction of said diskette, comprising a slidable engaging piece (33) mounted on said ejection bedplate and sliding while contacting with said guide at the time of transference of said ejection bedplate; and an engaging stepped portion (34) mounted on said guide and engaging with said slidable engaging piece under such a condition that said diskette is forcibly inserted to a prescribed position to set the same to prevent the transference of said ejection bedplate along the ejecting direction of said diskette by means of said coiled spring; said ejection bedplate being rotatably mounted on said guide around the transferring direction of said ejection bedplate as its axis; torsional force of said coiled spring being applied to said ejection bedplate as torsional force towards the direction in which said slidable engaging piece contacts with said guide; said ejection bedplate (23) being provided with a projection (35) for releasing engagement, and an arm (36) for engaging said projection (35) to release said slidable engaging piece (33) from engagement with said stepped portion (34), said arm further preventing transference of said bedplate (23).

2. A diskette ejecting mechanism as claimed in claim 1, wherein said coiled spring for ejecting a diskette is composed of a compressed or tensioned coiled spring under said condition that said diskette is forcibly inserted to a prescribed position to set the same.

3. A diskette ejecting mechanism as claimed in claim 1, wherein said coiled spring for ejecting a diskette and said ejection bedplate are mounted on a guide rod (31), and said ejection bedplate is rotated with respect to said guide rod by said coiled spring.

4. A diskette ejecting mechanism as claimed in claim 3, wherein one end of said coiled spring is fixed to said guide or said guide rod, whilst the other end of said coiled spring is engaged with said ejection bedplate in such a manner that said coiled spring exerts torsional force on said bedplate.

5. A diskette ejecting mechanism as claimed in claim 1, wherein said arm for releasing engagement is driven to disengage the engagement of a diskette with said projection for releasing engagement of said ejection bedplate in case of ejecting said diskette.

6. A diskette ejecting mechanism as claimed in claim 1, wherein said arm for releasing engagement is secured to a bridge (4) supported rotatively on said frame.

* * * * *